(12) United States Patent
Iverson et al.

(10) Patent No.: US 9,531,726 B2
(45) Date of Patent: *Dec. 27, 2016

(54) SYSTEMS AND METHODS FOR AUTOMATIC DISCOVERY OF SYSTEMS AND ACCOUNTS

(71) Applicant: BeyondTrust Software, Inc., Phoenix, AZ (US)

(72) Inventors: Gyle Iverson, Woodland Hills, CA (US); Jeffery Nielsen, Simi Valley, CA (US); Julie Lustig-Rusch, West Hills, CA (US); James Mitchell, Moorpark, CA (US)

(73) Assignee: BeyondTrust Software, Inc., Agoura Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/983,418

(22) Filed: Dec. 29, 2015

(65) Prior Publication Data
US 2016/0149924 A1 May 26, 2016

Related U.S. Application Data

(63) Continuation of application No. 14/327,087, filed on Jul. 9, 2014, now Pat. No. 9,225,723, which is a continuation of application No. 12/571,231, filed on Sep. 30, 2009, now Pat. No. 8,863,253, which is a continuation-in-part of application No. 12/497,429, filed on Jul. 2, 2009, now Pat. No. 9,160,545.

(60) Provisional application No. 61/219,359, filed on Jun. 22, 2009.

(51) Int. Cl.
*H04L 29/06* (2006.01)

(52) U.S. Cl.
CPC .......... *H04L 63/102* (2013.01); *H04L 63/083* (2013.01); *H04L 63/10* (2013.01); *H04L 63/1433* (2013.01)

(58) Field of Classification Search
USPC ............................................................ 726/5
See application file for complete search history.

(56) References Cited

U.S. PATENT DOCUMENTS

| | | |
|---|---|---|
| 5,689,638 A | 11/1997 | Sadovsky |
| 5,719,941 A | 2/1998 | Swift et al. |
| 5,793,952 A | 8/1998 | Limsico |
| 5,944,825 A | 8/1999 | Bellemore et al. |
| 7,321,300 B2 | 1/2008 | Friedrich et al. |
| 7,506,038 B1 | 3/2009 | Perrone et al. |
| 7,950,051 B1 | 5/2011 | Spitz et al. |
| 7,962,709 B2 | 6/2011 | Agrawal |
| 8,346,626 B2 | 1/2013 | Robertson |

(Continued)

OTHER PUBLICATIONS

Bradshaw, R. et al., "A Scalable Approach to Deploying and Managing Appliances," Proceedings of the TeraGrid 2007 Conference, pp. 1-6, Jun. 4, 2007.

*Primary Examiner* — Jason Lee
(74) *Attorney, Agent, or Firm* — Hankin Patent Law, APC; Jimmy Sauz; Kevin Schraven

(57) ABSTRACT

In various embodiments, a method comprises scanning a directory structure to generate a scan result comprising a plurality of discovered systems, identifying one or more accounts associated with at least one of the plurality of discovered systems, configuring a security appliance to change one or more old passwords to one or more new passwords for the one or more accounts, and changing, with the configured security appliance, the one or more old passwords to the one or more new passwords.

12 Claims, 9 Drawing Sheets

(56) References Cited

U.S. PATENT DOCUMENTS

| | | |
|---|---|---|
| 2001/0049796 A1 | 12/2001 | Roth et al. |
| 2002/0169747 A1 | 11/2002 | Chapman et al. |
| 2004/0090930 A1 | 5/2004 | Lee et al. |
| 2004/0162880 A1 | 8/2004 | Arnone et al. |
| 2005/0015623 A1 | 1/2005 | Williams et al. |
| 2005/0182969 A1 | 8/2005 | Ginter et al. |
| 2005/0273399 A1 | 12/2005 | Soma et al. |
| 2007/0057763 A1 | 3/2007 | Blattner et al. |
| 2007/0255957 A1 | 11/2007 | Arnone et al. |
| 2008/0040606 A1 | 2/2008 | Narayanan et al. |
| 2008/0168545 A1 | 7/2008 | Inoue et al. |
| 2009/0150989 A1 | 6/2009 | Hoey et al. |
| 2009/0300057 A1 | 12/2009 | Friedman |
| 2010/0107227 A1 | 4/2010 | Hicks |
| 2010/0111300 A1 | 5/2010 | Kido et al. |
| 2010/0228749 A1 | 9/2010 | Castro et al. |
| 2010/0306236 A1 | 12/2010 | Cychosz et al. |
| 2010/0325703 A1 | 12/2010 | Etchegoyen |
| 2011/0179284 A1 | 7/2011 | Suzuki et al. |
| 2011/0271114 A1 | 11/2011 | Baysinger |

FIG. 6

| Number of Licenses | Licenses in Use | Selection Uses | Licenses Remaining |
|---|---|---|---|
| 1000 | 10 | 52 | 938 |

General | Selection Criteria | Selection Summary | View Results / Refine Batch

| Grouping | Category | | Is | | Value | Grouping |
|---|---|---|---|---|---|---|
| | 606 | | 608 | Equal / Not Equal | 610 — A list of the valid items based on the selected category | |
| AND<br>OR<br>AND (<br>OR ( | Enter Text<br>Service Name<br>Service Account Name<br>System Name<br>Platforms<br>Domains<br>Sites<br>Organizational Units<br>Groups<br>On Hold | | | | | |

500
602
604

| Number of Licenses | Licenses in Use | Selection Uses | Licenses Remaining |
|---|---|---|---|
| 1000 | 10 | 52 | 938 |

| Category | Enterprise | Managed | On Hold | Disabled | Unresponsive | Selected | Unselected |
|---|---|---|---|---|---|---|---|
| Enterprise | 706 | | | | | | |
| Platforms | | 708 | 710 | 712 | 714 | 716 | 718 |
| Windows | | | | | | | |
| Workstations | | | | | | | |
| Servers | | | | | | | |
| 2000 | | | | | | | |
| 2003 | | | | | | | |
| 2008 | | | | | | | |
| HP-UX | | | | | | | |
| Solaris | | | | | | | |
| Linux | | | | | | | |
| symark.com | | | | | | | |
| zoo.symark.com | | | | | | | |
| windev.symark.com | | | | | | | |
| Sites | | | | | | | |
| Organizational Units | | | | | | | |
| Groups | | | | | | | |
| On Hold | | | | | | | |

Tabs: General | Selection Criteria | Selection Summary | View Results / Refine Batch

FIG. 7

| | Number of Licenses | Licenses in Use | Selection Uses | Licenses Remaining |
|---|---|---|---|---|
| | 1000 | 10 | 52 | 938 |

General | Selection Criteria | Selection Summary | View Results / Refine Batch ~802

| Sel | System Name | Platform | Domain | OU | Site 812 | Description | Groups | On Hold | Dis/Unresp |
|---|---|---|---|---|---|---|---|---|---|
| ☑ | AJLT2205 | Windows ~808 | corp.ajax.com ~810 | Corporate | | Laptop 2205 -- VP Ops ~816 | Administration, Executive, Laptops ~818 | ☐ ~820 | ☐ ~824 |
| ☑ | AJMP9 | MacOS 814 | corp.ajax.com | Corporate | DTFL4 | Mac Pro 9 -- Graphics Department | Graphics, OSX | ☐ 822 | ☐ |
| ☑ | AJWS1092 | Windows | corp.ajax.com | Corporate | DTFL2 | Workstation 1092 -- Payroll Clerk | Payroll, Administration, Clerical, 1stFloor | ☐ | ☐ |
| ☑ | AJWS1102 | Windows | corp.ajax.com | Corporate | DTFL1 | Workstation 1102 -- Admin Assistant to VP Ops | Administration, Clerical, 4thFloor | ☐ | ☐ |
| ☑ | AJWS201 | Windows | corp.ajax.com | Warehouse | DTFL4 | Workstation 201 -- Warehouse front office | Warehouse, Public | ☐ | ☐ |
| ☑ | AWWS203 | Windows | corp.ajax.com | Warehouse | DTWH1 | Workstation 203 -- Warehouse Shipping | Warehouse, Shipping | ☐ | ☐ |
| ☑ | AWWS204 | Windows | corp.ajax.com | Warehouse | DTWH1 | Workstation 201 -- Warehouse Recieving | Warehouse, Receiving | ☑ | ☐ |

FIG. 8

SYSTEMS AND METHODS FOR AUTOMATIC DISCOVERY OF SYSTEMS AND ACCOUNTS

CROSS-REFERENCE TO RELATED APPLICATION

The present application is a continuation of and seeks priority from U.S. Nonprovisional patent application Ser. No. 14/327,087, filed Jul. 9, 2014, entitled "Systems and Methods for Automatic Discovery of Systems and Accounts," which is a continuation of and claims priority from U.S. Nonprovisional patent application Ser. No. 12/571,231, filed Sep. 30, 2009, entitled "Systems and Methods for Automatic Discovery of Systems and Accounts," which is a continuation-in-part of and claims priority from U.S. Nonprovisional patent application Ser. No. 12/497,429, filed Jul. 2, 2009, entitled "Systems and Methods for A2A and A2DB Security Using Program Authentication Factors," which claims priority from U.S. Provisional Patent Application No. 61/219,359, filed Jun. 22, 2009, entitled "Systems and Methods for A2A and A2DB Security Using Program Authentication Factors," which are all hereby incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to automatic discovery. More particularly, the invention relates to systems and methods for automatic discovery of systems and accounts.

2. Description of Related Art

Often too many users of a network are granted full, unrestricted superuser, root, or administrator privileges, regardless of whether or not they need this access all the time and regardless of whether they need access to perform their current duties. This "all trusting" environment is frequently coupled with a lack of accountability of this access. Unfortunately, these privileged accounts are often exploited by unethical insiders and hackers to perpetrate fraud, theft, and damage.

In response to the possible damages caused by an "all trusting" environment, some administrators administrate privileged and embedded passwords. However, due to the depth of access that privileged and embedded passwords provide to highly sensitive and confidential information, and the fact that these access credentials are shared among administrators, it is only natural that security experts and compliance auditors are recommending and requiring more scrutiny and control in this area. Without a system of checks and balances and overall accountability for privileged and embedded passwords, an organization lays itself open to exploitation and exposes its mission-critical systems to intentional or accidental harm and malicious activity that is difficult and costly to repair.

Further, the problems of adding privileged and embedded passwords to systems become more complex as the system grows. It is not uncommon that large corporations contain networks with heterogeneous computing environments that are constantly changing. Machines, services, accounts, and applications are typically constantly added and deleted. Management of these systems is often not cost effective or timely. As a result, even if specific machines are well secured, the overall security of the changing environment is often lax and riddled with weaknesses.

SUMMARY

In various embodiments, a method comprises scanning a directory structure to generate a scan result comprising a plurality of discovered systems, identifying one or more accounts associated with at least one of the plurality of discovered systems, configuring a security appliance to change one or more old passwords to one or more new passwords for the one or more accounts, and changing, with the configured security appliance, the one or more old passwords to the one or more new passwords.

In some embodiments, the method may further comprise receiving a selection filter from a user and applying the selection filter to the scan result to select at least one of the plurality of discovered systems. The configuring a security appliance to change the one or more old passwords to the one or more new passwords for the one or more accounts, and the changing, with the configured security appliance, the one or more old passwords to the one or more new passwords, may comprise configuring the security appliance to change the one or more old passwords to the one or more new passwords for the one or more accounts associated with the selected at least one of the plurality of discovered systems and changing the one or more old passwords to the one or more new passwords.

Further, in some embodiments, the method further comprises comparing the selected at least one of the plurality of discovered systems to a management data structure, the management data structure comprising a list of managed systems to identify at least one unmanaged system. The configuring a security appliance to change the one or more old passwords to the one or more new passwords for the one or more accounts, and the changing, with the configured security appliance, the one or more old passwords to the one or more new passwords, may comprise configuring the security appliance to change the one or more old passwords to the one or more new passwords for the one or more accounts associated with the at least one unmanaged system and changing the one or more old passwords to the one or more new passwords. In some embodiments, the identified at least one unmanaged system is not on-hold, disabled, or unresponsive. The method may further comprise receiving an indication from the user that the selection filter is to be applied to future scan result. Further, the method may also comprise receiving an indication from the user that the selection filter is to be applied only to the scan result and not to future scan result. The directory structure may comprise an active directory.

In some embodiments, a security appliance comprises a scan module and a password manager module. The scan module may be configured to scan a directory structure to generate a scan result comprising a plurality of discovered systems and identify one or more accounts associated with at least one of the plurality of discovered systems. The password manager module may be configured to change the one or more old passwords to the one or more new passwords.

In various embodiments, a computer readable medium comprises executable instructions. The instructions may be executable by a processor to perform a method. The method may comprise scanning a directory structure to generate a scan result comprising a plurality of discovered systems, identifying one or more accounts associated with at least one of the plurality of discovered systems, configuring a security appliance to change one or more old passwords to one or more new passwords for the one or more accounts, and changing, with the configured security appliance, the one or more old passwords to the one or more new passwords.

BRIEF DESCRIPTION OF THE DRAWINGS

FIG. 6 is an interface display of the selection criteria tab window within the selection filer details window in an embodiment.

FIG. 7 is an interface display of a selection summary tab window within the selection filer details window in an embodiment.

FIG. 8 is an interface display of a view results/refine batch tab window within the selection filer details window in an embodiment.

DETAILED DESCRIPTION OF THE INVENTION

In order to manage the security of a changing environment, a security system such as a password management system may be configured to automatically scan the environment for systems (e.g., digital devices, services, applications, and files) and/or accounts associated with systems. Those systems and/or accounts may then be identified and brought under management.

The result of the scan may be compared to those systems and/or accounts that are already managed to further isolate those systems and/or accounts that are currently unmanaged. In some embodiments, the security system may bring all unmanaged systems and/or accounts under management.

Administrators, however, may wish to be more selective than automatically bringing unmanaged systems and/or accounts under management. Some systems may be new, undergoing configuration, being replaced, or are otherwise unsuited for management at that time (e.g., for network management reasons). As a result, in some embodiments, an administrator or other user may generate one or more selection filters to apply to the scan result to select those systems that are to be placed under management.

Figure 1:
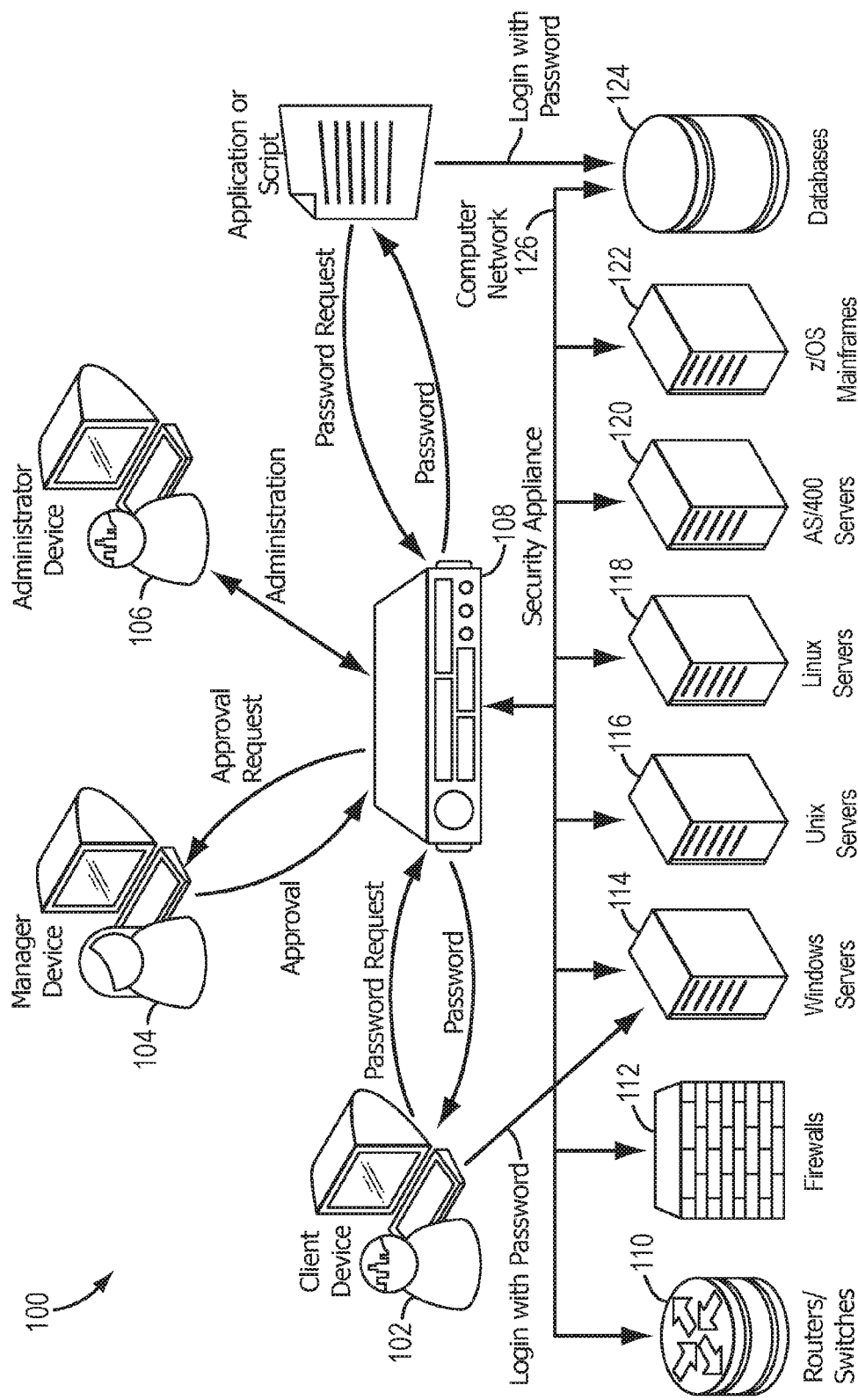
FIG. 1 illustrates a security appliance that manages passwords in a heterogeneous computing environment in one embodiment.

FIG. 1 illustrates a security appliance 108 that manages passwords in a heterogeneous computing environment 100 in one embodiment. The heterogeneous computing exemplary environment 100 comprises a client device 102, a manager device 104, and an administrator device 106 which may each communicate with the security appliance 108. Routers/switches 110, firewalls 112, windows servers 114, UNIX servers 116, Linux servers 118, AS/400 servers 120, z/OS mainframes 122, and databases 124 may each be operatively coupled to a computer network 126 which may be operatively coupled to the security appliance 108.

In various embodiments, a digital device may comprise the client device 102, the manager device 104, the administrator device 106, the security appliance 108, routers/switches 110, firewalls 112, the windows servers 114, the UNIX servers 116, the Linux servers 118, the AS/400 servers 120, the z/OS mainframes 122, and/or the databases 124. A digital device is any device with a processor and memory such as a computer. Digital devices are further described herein.

In various embodiments, a user at the client device 102 may wish access to another digital device (e.g., one of the windows servers 114). The client device 102 may provide the security appliance 108 a password request that identifies the user and the device to be accessed (e.g., log onto one of the windows servers 114 and/or one or more accounts on the windows server). Upon approval, the security appliance 108 may check out a password to the user. In some embodiments, approval may be automatic (e.g., based on prior approval of the user and/or client device 102) or the approval may not be automatic (e.g., approval is required from a manager at manager device 104). In one example, the security appliance 108 receives the password request and determines if the password request may be automatically approved. If automatic approval is not available or allowed, the security appliance 108 may forward the password request (or information regarding the password request) to the manager device 104 for approval (e.g., by a manager at the manager device 104). Those skilled in the art will appreciate that there are many ways in which the password request may be approved.

In some embodiments, the client device 102 is any digital device with an application that may seek access to a secured application and/or secured database. In one example, the user of the client device 102 may be an accountant and the seeking application may be Microsoft Access. The accountant may wish to access a secured accounting database on a network (e.g., stored within the databases 124). Before the seeking application gains access to the secured accounting database, a request to access the database (e.g., a registration request) may be approved.

Once approved, the client device 102 may receive a password (e.g., the password is checked out to the user and/or client device 102) to be stored within the client device 102. Alternately, the password is not stored within the client device 102 but rather the client device 102 may receive the password when the seeking application requests access to the secured application. In some embodiments, the password may be associated with an expiration event after which the password is expired and the client device 102 must then request another password.

A seeking application is any application that is required a password or other authentication information before accessing a secure application and/or secured database. A secured application is any application that requires a password or other authentication information before being able to access the secured application. Similarly, a secured database is any database that requires a password or other authentication information before access is granted.

The manager device 104 is any digital device that may approve a registration request and/or a password request. In some embodiments, a registration request may be provided by the client device 102. The registration request may include information about the user of the client device 102, the client device 102, itself, and/or the seeking application. The manager and/or an application on the manager device 104 may review the registration request and approve or deny the request. In one example, the manager device 104 is operated by a manager that may approve the registration request from the client device 102. In another example, the manager device 104 may be configured to automatically approve the registration request. In some embodiments, the manager of the manager device 104 may approve one or more components of the registration request (e.g., program factors discussed herein) and the manager device 104 is configured to approve the same or different components of the registration request.

In some embodiments, the security appliance 108 may receive, from a user, a password request that does not require approval. The security appliance 108 may then check out a password to the user. Further, if a password request is received from an application, and the seeking application is approved based on validity of program factors, the security appliance 108 may check out a password to the seeking application. If the user submits a password request that requires approval the security appliance 108 may forward the password request as well as any other information (e.g., user identifier and/or seeking application information) to the manager and/or manager device. Similarly, if a seeking application submits a password request and the seeking application is not confirmed based on program factors, the security appliance 108 may forward the password request as well as any other to the manager and/or manager device Program factors may comprise application authentication factors and system authentication factors. A few examples of program authentication factors include a program name, program version, program executable hash, dependent DLL or shared library names, and dependent DLL or shared library versions. In one example, the program factors include the name of the seeking application as well as the version number of the seeking application. In some embodiments, the security appliance 108 makes a hash of the executable of the seeking application and includes the hash as a program factor. Further, the security appliance 108 may include the name or copy one or more DLL libraries that the seeking application depends on (and/or shared library names) within the program factors. Further, the security appliance 108 may include the version number of one or more DLL libraries and/or shared libraries in the program factors. In some embodiments, the program authentication factors may be used to confirm that the seeking application is authentic as opposed to malware posing as an otherwise authorized seeking application. Those skilled in the art will appreciate that the program factors are not limited to only those identified herein, but may include other information regarding the seeking application, the user, or the client device 102.

Those skilled in the art will appreciate that there may be any number of ways a manager and a managing device 104 may, either in combination or separately, review and examine registration requests for approval or denial. Further, those skilled in the art will appreciate that the manager device 104 may be optional and the approval process may take place within the security appliance 108 (further described herein) and/or the administrator device 106.

The administrator device 106 is any digital device that configures the security appliance 108. In various embodiments, the administrator device 106 is operated by an administrator (e.g., a network administrator, security officer, or IT professional) who can configure the security appliance 108. In one example, the administrator device 106 may display a configuration interface (e.g., a web page from the security appliance 108) that allows configuration. The administrator device 106 may configure the security appliance 108 to perform different tasks depending upon the seeking application, the user of the user device 102, and/or the user device 102. In one example, the administrator device 106 may specify specific manager devices 104 which must approve a registration request from a specific user name before the registration request may be approved and access to a secured application provided (e.g., via a password). The administrator device 106 may also specify program factors that must be confirmed as well as what the values of the program factors are expected to be. Those skilled in the art will appreciate that the security appliance 108 may be configured in any number of ways.

The security appliance 108 may comprise hardware, software, or a combination of both. In various embodiments, a digital device comprises the security appliance 108. The digital device may be cabled to (or otherwise in communication with) the computer network 126. In some embodiments, the security appliance 108 may comprise software configured to be run (i.e., executed) by a server, router, or other device. The security appliance 108 may also comprise hardware. For example, the security appliance 108 may comprise a windows 2003 server (such as a hardened Windows 2003 server or a hardened Windows 2008 server), with quad-core CPUs, hot swap mirrored drives, redundant power supplies, and redundant fans. The security appliance 108 may also comprise redundant CPUs and hot-bank memory.

In various embodiments, the security appliance 108 is configured (e.g., by an administrator and/or the administrator device 106) to provide security for applications and databases. In some examples, the security appliance 108 may be configured to process registration requests, generate and change passwords, log relevant information, and check out passwords.

In some embodiments, the security appliance 108 processes registration requests. In one example, prior to a seeking application on a client device 102 being allowed to access a secured application or secure database, the security appliance 108 may require registration. The user device 102 may then provide a registration request to the security appliance 108. The registration request may include information regarding the user, the client device 102, and/or the seeking application. Based on a prior configuration, the security appliance 108 may, based on the user, the client device 102, and/or the seeking application, review the registration request and/or route the registration request to one or more manager devices 104 for approval. In one example, the security appliance 108 may be configured to determine if the client device 102 and/or the user logged into the client device 102 have rights to the secured application and/or secured database. If the client device 102 and/or the user do not have rights, the security appliance 108 may be configured to deny the registration request. The security appliance 108 may also be configured to email or otherwise contact one or more manager devices 104 to receive approval for the registration request. For example, the administrator may configure the security appliance 108 to email all registration requests associated with a particular seeking application to a predetermined number of managers and/or manager devices 104. In some embodiments, the security appliance 108 may not approve the registration request until all managers and/or manager devices approve the registration.

The security appliance 108 may also be configured to generate and/or change passwords for accounts. In some examples, the accounts may allow access to digital devices, services, files, and/or applications. The security appliance 108 may be configured to generate complex passwords to the accounts and change the passwords at predetermined times or intervals. In some embodiments, the security appliance 108 may check out a current password to the user of the client device 102 and then subsequently change the password thereby increasing security by complex passwords that change over time. In one example, the security appliance 108 determines an expiration event at set intervals (e.g., every few seconds, minutes, hours, and/or days), at set times (e.g., at 1:05 AM every day), or at set times and dates (e.g., 3:00 AM on the 15th of a month). Those skilled in the art will appreciate that there are many ways to schedule one time or recurring events to trigger creation of a new password and/or changing existing passwords to accounts.

In various embodiments the security appliance 108 is configured to generate the password to the secure application and/or secured application. In one example, a method to create a password to a specific secured database (e.g., a secured SQL database) is stored within and executable by the security appliance 108. For example, the method may comprise executable instructions which are executable by a processor to perform a method of creating or changing a password for one or more secured applications and/or secured databases. The security appliance 108 may interact directly with one or more digital devices, secured applications, and/or secured databases to create or change the password.

The security appliance 108 may also change the password to the secured application and/or the secured database. In various embodiments, as discussed herein, the security appliance 108 determines an expiration event after which a password is expired (e.g., after a predetermined time or date). At that time, the security appliance 108 will change the password to the secured application and/or the secured database. In one example, the security appliance 108 interacts with the secured application and/or the secured database to change the password and then the security appliance 108 may store the password.

It will be appreciated by those skilled in the art that the security appliance 108 may encrypt the password and/or encrypt storage where the password is stored. Further, the security appliance 108 may encrypt all communications between the security appliance 108 and any other digital device (e.g., all communication between the client device 102 and the security appliance 108 may be encrypted). In various embodiments, the security appliance 108 performs FIPS-140 validated encryption of data and communications, access control mechanisms, secure storage of credentials, secure audit trails. The security appliance 108 may also comprise a sealed operating system.

The security appliance 108 may also be configured to log all registration requests, passwords, password changes, and password requests thereby creating a record of the activities of each user, client device 102, and/or seeking application. In some embodiments, the logs of the security appliance 108 may be used to confirm that the secured application and/or the secured database are being used as approved. The logs may also be encrypted. In various embodiments, the logs may be audited (e.g., by the administrator and/or the administrator device 106). The security appliance 108 may also be configured to provide reports regarding user/approver, requester activities, password maintenance, user and file entitlement (rights) and/or internal diagnostics. In a few examples, the reports may be exportable in CSV and HTML formats.

Although FIG. 1 shows curved lines between the client device 102 and the security appliance 108, the manager device 104 and the security appliance 108, as well as the administrator device 106 and the security appliance 108, those skilled in the art will appreciate that the client device 102, manager device 104, and administrator device 106 may not be each directly connected to the security appliance 108. In one example, the client device 102, manager device 104, and administrator device 106 may be in communication with the security appliance 108 over one or more networks. The curved lines in FIG. 1 may depict the nature of the communication between a digital device and the security appliance 108. In one example, in order to receive a password to log into the windows servers 114, the client device 102 may send a password request to the security appliance 108. The security appliance 108 may be configured by the administrator device 106 (e.g., as depicted in FIG. 1 as "administration") to send the password request to the manager device 104 for approval. The manager device 104 may send the approval to the security appliance 108 which may then provide the password to the client device 102. The password may then be provided to the Windows servers 114. In some embodiments, the password is not visible or displayed to the user of the client device 102. In various embodiments, the password that is being checked out for an account on the Windows Server 114 may have been put in place on the Windows Server 114 at the last scheduled password rotation. After the previous password request expired, the password may be changed to prevent the previous requestor from re-accessing the server after his password checkout interval expired.

In another example, the client device 102 may comprise a seeking application or script (depicted in FIG. 1) which seeks access to a secured database. Prior to access, the client device 102 (e.g., via the seeking application or script) may provide the password request to the security appliance 108 which may either provide the password or provide the password after the proper approvals have been obtained. The password may then be checked out to the client device 102 which may log into the secured database with the password to obtain access.

Those skilled in the art will appreciate that the security appliance may not be limited to password management. Although various embodiments described herein refer to generating, changing, and providing passwords to access the secured host, the secured application and/or the secured database, those skilled in the art will appreciate that similar systems and methods may be used with any form of security, including the issuance of encryption keys (e.g., private or public keys), certificates, digital signatures, decryption keys, credentials as well as rights management to files, volumes, and/or devices. In various embodiments, instead of a password being provided to the client device 102, the security appliance 108 may alter user rights such that the user may view, access, make changes to, and/or share the secured application and or secured database. In some embodiments, the security appliance 108 may provide a password to the client device 102 as well as make changes to file rights. In exemplary embodiments, the security appliance 108 may provide access in many ways.

In some embodiments, a seeking application on the client device 102 may be required to provide a registration request for rights to a program or database on another digital device. The rights may include, but are not limited to, rights to view, access, make changes, and share with other users. The security appliance 108 may perform similar tasks as when a password is requested. In one example, the security appliance 108 may examine the registration request and analyze program factors to ensure that the seeking application is authorized and/or authenticated. The registration request may also be approved by one or more manager devices 104. Upon approval, the security appliance 108 may grant any number of rights to access the application or database. Further, the security appliance 108 may generate a new password for the sought application or database and/or provide the password to the client device 102.

In various embodiments, when a seeking application requests a password for the first time or when a change in program factors is requested, registration may be required. A registration request presents the program factors for the seeking application so the program factors can be approved by a user (e.g., manager or administrator) with program administrator role.

Although the security appliance 108 is depicted as communicating directly over the computer network 126, the security appliance 108 may also communicate indirectly over the computer network 126. In one example, the security appliance 108 may be a part of or otherwise coupled to the client device 102, the manager device 104, the administrator device 106, the security appliance 108, the routers/switches 110, the firewalls 112, the windows servers 114, the UNIX servers 116, the Linux servers 118, the AS/400 servers 120, the z/OS mainframes 122, and the databases 124. Alternately, those skilled in the art will appreciate that there may be multiple networks and the security appliance 108 may communicate over all, some, or one of the multiple networks. In some embodiments, the computer network 126 comprises a bus.

The security appliance 108 may comprise a software library that provides a programmatic interface to the security appliance 108. In one example, an API library resident on the security appliance 108 may have a small set of functions that are rapidly mastered and readily deployed in new or existing applications. There may be several API libraries, for example one library for each computer language or technology, such as, Java, .NET or C/C++ languages. Each specific instance, the API library may provide the same set of functions.

The routers/switches may comprise any number of routers and/or switches. In some embodiments, the security appliance 108 may manage rights or access to one or more routers or switches. The client device 102 may be required to provide a registration request and receive approval before rights to access the routers or switches are approved. The routers/switches 110 may comprise Cisco routers and switches for example. In another example, the routers/switches 110 may comprise a Terminal Access Controller Access-Control System (TACACS). The routers/switches 110 may also comprise web proxies or caches including, but not limited to, BlueCoat Security Gateway devices.

The firewalls 112 may comprise hardware, software, or a combination of both hardware and software. Control to access and manage the firewalls 112 may be controlled by the security appliance in a method similar to that described herein. In one example, before the user of the client device 102 is permitted to access and/or configure the firewall 112, the client device 102 may be required to provide a registration request that must be approved. In a few examples, the firewalls 112 may comprise Cisco PIX, Netscreen, Nokia IPSO, Check Point, or Cyberguard.

The windows servers 114 may include any server configured with a Microsoft Windows operating system. In a few examples, the Microsoft operating system may be Windows 2000, 2003, XP, Media Center, Active Directory, NT 4.0, NT Domains, Vista, and Windows 7.

The UNIX servers 116 may include any server configured with a UNIX operating system. In a few examples, the UNIX operating system may be Solaris, AIX, HP-UX, Tru64, or UNIXWare. Similarly, the Linux server 118 may be any server configured with the Linux operating system. In a few examples, the Linux operating system may be Red Hat or Suse.

The AS/400 servers 120 and the z/OS servers 122 may include any server(s) with the associated operating system. Further a server may be configured with RACF, HP iLo, VMware, BoKS, Fujitus RSB, and Radius.

The databases 124 may comprise hardware, software, or a combination of hardware and software. In one example, the databases 124 are on a file server. The databases may include Oracle databases, Microsoft SQL, Sybase, MySQL, DB2 or any other database for example.

Those skilled in the art will appreciate that many operating systems, databases, and applications may be in communication with or otherwise coupled to the computer network 126. The examples listed herein are not intended to be limiting and other operating systems, databases, and applications may be used in conjunction with various embodiments described herein.

The computer network 126 may provide communication between the client device 102, the manager device 104, the administrator device 106, the security appliance 108, routers/switches 110, firewalls 112, the windows servers 114, the UNIX servers 116, the Linux servers 118, the AS/400 servers 120, the z/OS mainframes 122, and/or databases 124. In some embodiments the computer network 126 represents one or more network(s) which one or more digital devices may use to communicate. In some examples, the computer network 126 comprises Ethernet cables, fiber optic, or other wired network topology. In other examples, the computer network 126 may be wireless and support wireless communication between two or more wireless devices. Those skilled in the art will appreciate that the computer network 126 may comprise two or more networks, including wired and wireless networks.

Although the routers/switches 110, the firewalls 112, the windows servers 114, the UNIX servers 116, the Linux servers 118, the AS/400 servers 120, the z/OS mainframes 122, and the databases 124 are discussed as plural, those skilled in the art will appreciate that there may be any number of (including one or zero) routers/switches 110, the firewalls 112, the windows servers 114, the UNIX servers 116, the Linux servers 118, the AS/400 servers 120, the z/OS mainframes 122, and the databases 124 and be within embodiments described herein.

Figure 2:
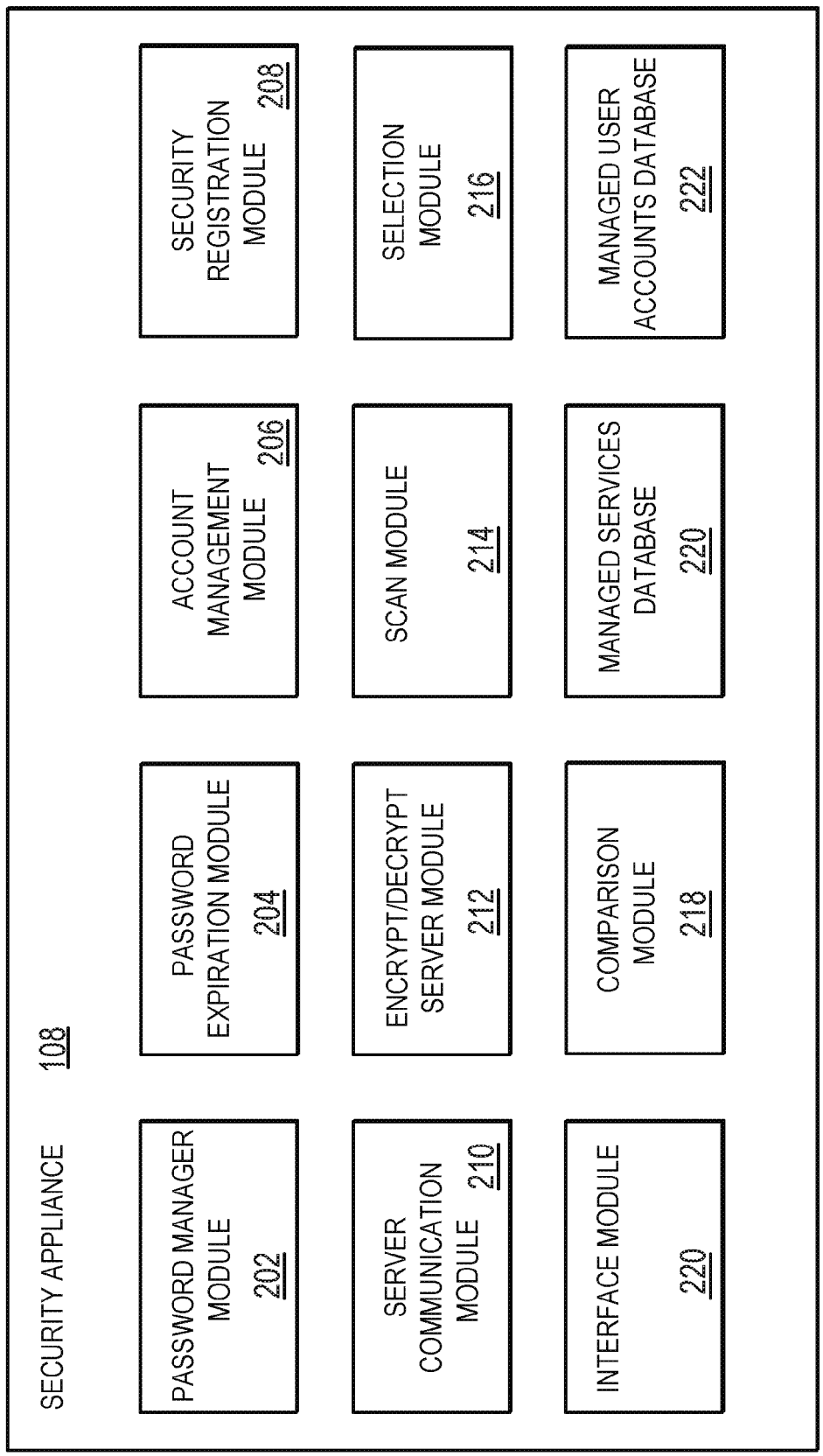
FIG. 2 is a block diagram comprising a security appliance in one embodiment.

FIG. 2 is a block diagram comprising a security appliance 108 in one embodiment. The security appliance 108 may apply tools for rapid implementation of services to one or more systems and/or accounts. In various embodiments, the security appliance 108 may be configured to scan a directory structure (e.g., a Microsoft Active Directory) for systems (e.g., digital devices, services, applications, and files) and/or accounts associated with the systems. A directory structure is any structure that may comprise manageable systems and/or manageable accounts. The security appliance 108 may then generate a scan result. In one example, the security appliance 108 may be configured to scan a domain to find new systems to manage.

The security appliance 108 may also scan for systems and then allow an administrator to select which systems and/or associated accounts to be managed by the security appliance 108. In some embodiments, the security appliance 108 allows the administrator (e.g., via a selection interface) to select systems and/or accounts to be managed. The administrator may also be able to select groups of systems, accounts, or combinations of both.

The security appliance 108 comprises a password manager module 202, a password expiration module 204, an account management module 206, a security registration module 208, a server communication module 210, an encrypt/decrypt server module 212, a scan module 214, a selection module 216, an interface module 220, a comparison module 218, a managed services database 220, and a managed user accounts database 222.

The password manager module 202 may be configured to control the security appliance 108. The password manager module 202 may be configured to change a password for an account. The account may be associated with any system. In one example, the password manager module 202 creates a new password to an administrator account for a file server. The password manager module 202 may then create a new password to replace the old password at an expiration event (further described herein). In various embodiments, one or more administrators and/or digital devices may define criteria for new passwords. In some examples, the criteria may require that a password comprise more (e.g., above a threshold), less (e.g., below a threshold), and/or an exact number of special characters, letters, uppercase letters, lowercase letters, and/or numbers. The criteria may also require that the password comprise a number between two thresholds (e.g., above a lower threshold and below an upper threshold) of special characters, letters, uppercase letters, lowercase letters, and/or numbers.

In some embodiments, the password manager module 202 comprises a library of executable instructions which are executable by a processor for changing the password to a secured application or secured database. The library may comprise any number of methods for generating or changing passwords to any number of secured programs or secured databases. For example, a program stored in the library may be configured to change the password to a SQL database.

Once a password is generated or otherwise changed, the password expiration module 204 may determine an expiration event for the password. In some embodiments, the expiration event may be a few minutes before the password much be changed and a new expiration event determined. Alternately, the expiration event may be hours, days, weeks, or longer. Before expiration, passwords that are generated or changed can be used by the client device 102. In some embodiments, once the password is changed and the password expiration module 204 determines the expiration event, the password manager module 202 provides the password and the expiration event to the client device 102 which may store the password and the expiration event.

In some embodiments, the password manager module 202 may receive a password request from the client device 102. The account management module 206 may then determine if the password request is authentic and authorized (e.g., via one or more program factors that may be received with the password request). In one example, the account management module 206 identifies the user, the client device 102, and/or the seeking application based on the password request and/or any program factors accompanying the password request. The account management module 206 may maintain separate accounts for each user, client device 102, seeking application, and/or any combination of the three. A program account may be similar to a CLI user account but the program account may be maintained and stored in the security appliance 108.

The account management module 206 may be configured to confirm one or more program factors. The program factors may be a part of a registration request from the client device 102, password request, or challenge factor response. During registration, the account management module 206 may request that the security agent 202 collect any number of program factors. The account management module 206 may then store the program factors. In one example, during registration, the account management module 206 may request the path of the executable for the seeking program from the client device 102 as well as a program executable hash. This information may be stored and used to confirm program factors later received if the registration is successful. In one example, previously stored program factors may be used to confirm program factors associated with a password request from the client device 102.

In some embodiments, the administrator device 106 may configure the account management module 206 to store acceptable values of program factors. In one example, the administrator device 106 identifies acceptable IP addresses, OS types, CPU serial numbers, executable hash values, user IDs and the like. The account management module 206 may receive program factors to be used to allow, confirm, and/or authenticate program factors later received from the client device 102 in any number of ways including both from the client device 102 and the administrator device 106. In one example, program factors that are used to allow, confirm, and/or authenticate other program factors may be provided by the client device 102, the manager device 104, and/or the administrator device 106.

When the account management module 206 receives program factors from the client device 102, the account management module 206 may compare the program factors (after decryption) to previously stored values to determine if the program factors are approved and authentic. In other embodiments, one or more of the program factors may be authenticate and/or confirmed by a manager device 104.

The security registration module 208 is configured to receive the registration request from the security agent 202 of the client device 102. In some embodiments, client password module 204 of the security agent 202 in the client device 102 will determine if a seeking program has first been registered before a password request is made. If the application is not registered, the program registration module 208 may generate the registration request as well as any program factors necessary for approval. The client password module 204 may then provide the registration request and the program factors to the password expiration module 204. In other embodiments, the security registration module 208 may first receive a password request from a seeking program on the client device 102 and then determine if the seeking application is registered. If the application is not registered, the security registration module 208 may send a request to the client device 102 for the registration request. In some embodiments, the request identifies one or more program factors that the client device 102 is to provide for approval of the registration request.

During registration, the security registration module 208 may examine one or more program factors received from the client device 102. In some embodiments, the security registration module 208 compares the program factors received from the client device 102 to predetermined values configured by the administrator device 106. Further, the administrator device 106 may configure the security registration module 208 to provide one or more of the program factors to one or more manager devices 104 for approval. In some embodiments, the same program factors may be approved by one or more manager devices 104 (or managers of the manager devices 104) as well as the security registration module 208. In one example, one or more program factors may be approved by the security registration module 208. One or more of the program factors and the registration request may then be forwarded (e.g., via email) to one or more manager devices 104 for approval. If the security registration module 208 determines that there is not a match, then the security registration module 208 may deny the registration request and the program factors and the registration request are not forwarded.

When the security registration module 208 forwards the registration request and the program factors to the one or more manager devices 104, the security registration module 208 may be configured to wait a predetermined period of time or when all approvals are received. In some cases, based on the configuration by the administrator device 106, any number of the program factors and/or the registration request may be approved by the manager devices 104 (or the approvers of the manager device 104). If the predetermined time expires and not all approvals are received, the security registration module 208 may deny the request. Further, if one denial is received at any time, the security registration module 208 may deny the request. If the request is denied, the seeking application may not be able to access the secured application and/or secured database.

The server communication module 210 is configured to provide communication between the security appliance 108 and the client device 102. The client communication module 210 may also be configured to communicate between the security agent 202 and the security appliance 108.

The encrypt/decrypt server module 212 may be configured to provide encryption, decryption, or other security measures for the security appliance 108. In some embodiments, the encrypt/decrypt server module 212 issues a program key. A program key can be an SSH DSS private key or an X509v3 client certificate, for example. The security appliance 108 may issue a program key for use on behalf a program account. In some embodiments, the program key may be a required parameter for API functions.

In some embodiments, the security appliance 108 does not allow direct access to the OS on the security appliance 108. Further, the security appliance 108 may comprise a firewall (e.g., with IPSEC support) to prevent hacking. Moreover, the security appliance 108 may perform encryption, such as FIPS-140 validated components, and perform hard disk AES 256-bit encryption for whole disk encryption. Passwords, once generated, may be stored with x509v3 certificates. In some embodiments, inbound connections may be only through HTTPS and SSH. The security appliance 108 may also support single- or two-factor authentication using LDAP Active Directory, SecureID, Safeword, and x509v3 certificates. The security appliance 108 may perform any or more than the functions listed herein.

The scan module 214 is configured to scan a directory structure or other data structure. In various embodiments, the scan module 214 is configured to scan for one or more systems. In one example, the scan result includes, for example, those systems that are managed, unmanaged, on-hold, disabled, and/or unresponsive. The scan module 214 may also be configured to scan for only managed systems, only unmanaged systems, or the like.

A managed system is a system that is managed by the security appliance 108. In one example, the security appliance 108 creates and changes passwords for one or more accounts associated with a managed system. The security appliance 108 may also approve password requests and check out passwords for managed systems. In some embodiments, the security appliance 108 does not create passwords, change passwords, approve password requests, or check out passwords for unmanaged systems.

A system is on-hold when a system when the scan module 214 or a user, such as an administrator, has indicated that the system is on-hold. An administrator may designate the system as on-hold for any number of reasons, including, for example, that the system is unstable, being configured, being updated, changed, replaced, or the like. Those skilled in the art will appreciate that any system may be put on-hold for any number of reasons.

The system may also be designated as disabled. A system may be designated as disabled when, for example, an administrator designates the system as disabled through the security appliance 108. In one example, a system may be causing a problem on a network and the system may be disabled to debug and exact repairs. In some examples, a disabled system may not be configurable or available for communication.

The system may be unresponsive. The security appliance 108 may attempt to communicate with the system to confirm the existence, configuration, or identity of the system. If the system does not communicate, produces errors, or is otherwise unavailable, the security appliance 108 may designate the system as unresponsive.

In some embodiments, the scan module 214 scans a directory structure such as Microsoft's Active Directory for one or more systems. The password manager module 202 may be automatically configured to manage the one or more systems of the scan result. In other embodiments, a user may select one or more systems from the scan result. The selection may then be managed or identified as on-hold or disabled.

Those skilled in the art will appreciate that an administrator may identify one or more physical systems and/or logical identifiers for the scan module 214 to scan.

The selection module 216 is configured to select one or more systems from the scan result. In some embodiments, the selection module 216 stores a selection filter. A selection filter is a filter that may be created by a user, such as an administrator, to select one or more systems from the scan result. In one example, the scan module 214 may generate scan result that comprises all active systems of a company. The selection module 216 may receive and apply one or more selection filters to select one, some, or all of the active systems in the scan result. In some embodiments, the selected systems may then be managed or unmanaged.

In various embodiments, once one or more systems are selected by the selection module 216, the security appliance 108 may be configured to manage those systems. In one example, the security appliance 108 may be configured to login, change the password, create a hash of a password, check the hash, and/or checkout passwords for a system and/or one or more accounts associated with the system.

The selection module 216 may comprise one or more selection criteria. In one example, the selection criteria for a selection filter perform as rules to be applied to the scan result for selecting one or more systems. The selection criteria may designate different scanned factors to select. In some examples, categories for selection criteria may comprise a service name, service account name, system name, platform, domain, site, organizational unit, group, on-hold, or the like. In one example, a selection filter may select any system associated with a selection criteria indicating an accounting organizational unit (i.e., OU=accounting). When applying the selection filter, the selection module 216 may then select all systems associated with the accounting organizational unit from the scan result. In one example, the selection filter may configure the selection module 216 to select systems from a scan result that are associated with a domain (e.g., the highest subdivision of a domain name in a network address which identifies the type of entity owning or associated with the address).

The selection module 216 may comprise any number of selection criteria. Selection criteria may comprise the category, a relationship, a value, and a conjunction (i.e., a relationship). The category, relationship, and value may work together to designate a selection. The value can be any valid item associated with one or more categories. For example, a value for the Groups category may comprise all groups recognized by a company. A value of a domain may comprise all domains recognized by a company. A conjunction may comprise a state of relationship between the category and the value. In some examples, the conjunction may be "equal" or "not equal." For example, one selection criteria may indicate that a category must be equal (i.e., a relationship) to a value in order to be selected (e.g., OU equal to accounting or domain not equal to cs.acme.org). Any number of these criteria may be grouped together through the conjunction.

A conjunction links two or more criteria with terms such as "and" or "or" and may also indicate priority. For example, a selection criterion may comprise an OU equal to engineering "and" a platform equal to Windows. As a result in this example, the selection filter will select all systems associated with the engineering organizational unit on a Windows platform. Those not on a Windows platform or not with the engineering organizational unit may not be selected in this example. The conjunction may be a Boolean operator. Those skilled in the art will appreciate that the selection criteria may include many different categories, relationships, values, and conjunctions.

The interface module 220 is configured to display an interface to a user such as an administrator to create, modify, or delete of one or more selection filters. Once a selection filter is generated, the user may designate the filter as "active" or associate the filter with "auto adopt." When the filter is active (or associated with "auto adopt"), the selection filter may be applied to future scans of the directory structure. In one example, scans of the directory structure are performed at predetermined times or intervals. An active selection filter may be applied to the scan result on every scan to select one or more systems. The user may also designate the selection filter as "manual" or "auto scan." When the selection filter is manual or associated with "auto scan," the selection filter may be applied once to scan result (e.g., the selection filter may be applied to the scan result of the next scan subsequent to the selection filter being committed).

The interface module 220 may display any number of windows and interfaces. Examples of displays include FIGS. 4-8.

The comparison module 218 is configured to compare the scan result to a data structure, such as a list, of managed systems. The comparison may occur before or after selection is made. In one example, the comparison module 218 compares the scan result form the scan module 214 to a list of managed systems before a selection filter is applied. In this example, the comparison module 218 may remove any systems from the scan result that matches the list of managed systems thereby identifying only unmanaged systems. The selection module 216 may apply one or more selection filters to the identified unmanaged systems to select one, all, or a portion of the identified unmanaged systems.

In another example, the selection module 216 may apply one or more selection filters to the scan result and then the comparison module 218 may compare the selected systems to the list of managed systems to identify only those systems that are both selected and identified. Those skilled in the art will appreciate that there may be many ways in which managed or unmanaged systems may be identified from the scan result and/or the selected results from the scan result.

The managed services database 220 and the managed user accounts database 222 may comprise one or more data structures. The managed services database may identify any number of services that are currently being managed by the security appliance 108. The managed user accounts database may identify any number of accounts and/or user accounts that are currently being managed by the security appliance 108. In some embodiments, the comparison module 218 compares the managed services database 220 and/or the managed user accounts database 222 to the scan result to identify one or more unmanaged systems. In some embodiments, the databases may be combined into one data structure or may comprise many data structures.

As discussed herein, one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Although discussion herein is directed to the scanning and selection of systems, those skilled in the art will appreciate that the scanning and selection may be performed on accounts, systems, a combination of systems and accounts, or any other hardware and/or software that may be managed by the security appliance 108.

Figure 3:
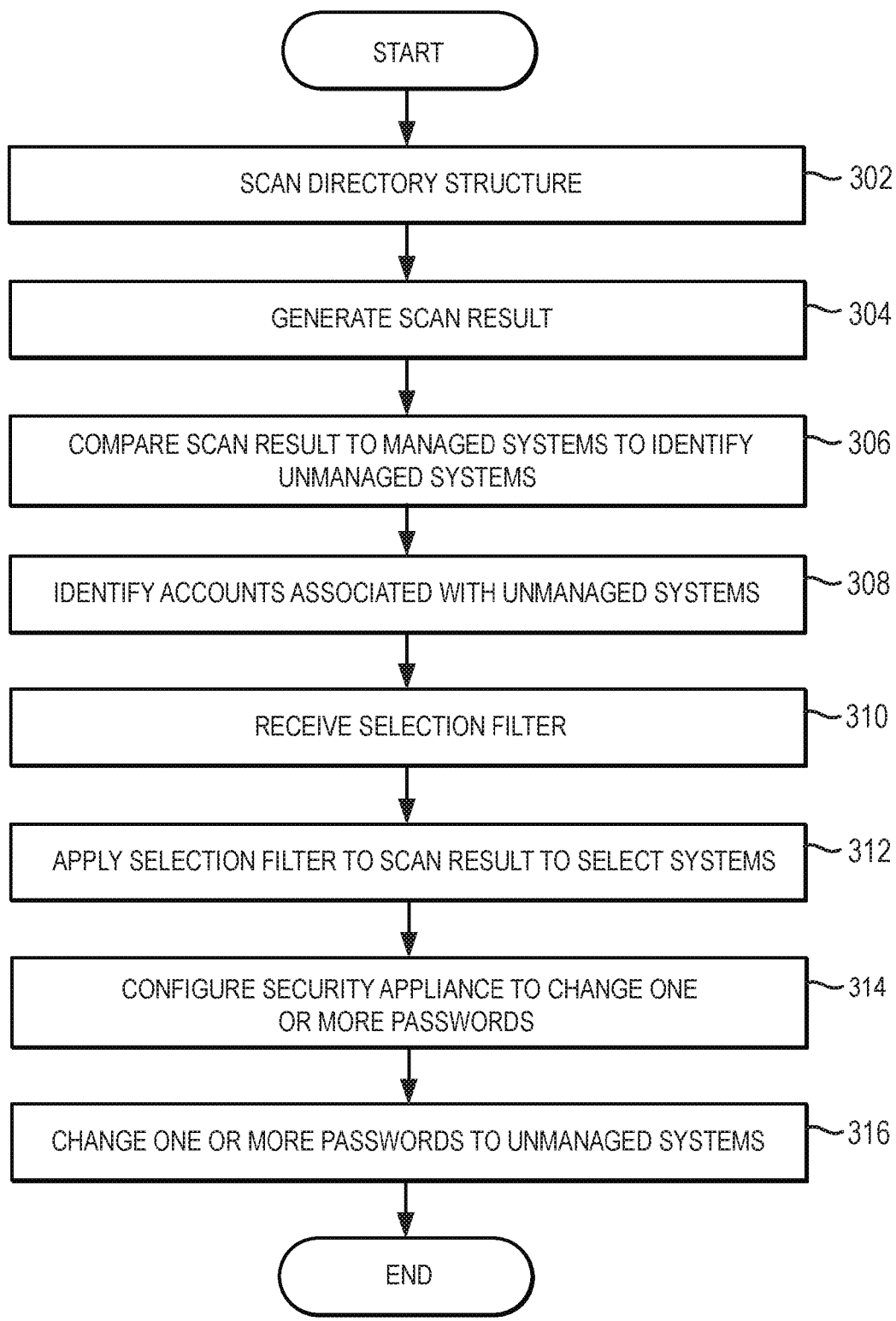
FIG. 3 is an exemplary method for automatic discovery of one or more selected systems in one embodiment.

FIG. 3 is an exemplary method for automatic discovery of one or more selected systems in one embodiment. In step 302, the scan module 214 scans one or more directory structures for systems. In some embodiments, the scan module 214 may scan multiple Active Directories. The scan module 214 may perform the scans at predetermined times and/or at predetermined intervals.

In step 304, the scan module 214 generates a scan result from the scan of one or more directory structures. The scan result may comprise a list of systems from the one or more scanned directory structures.

In step 306, the comparison module 218 compares the scan result to a list or other data structure of managed systems to identify unmanaged systems of the scan result. In various embodiments, the comparison module 218 retrieves the list of managed systems from a database such as the managed services database 220 and/or the managed user accounts database 222.

In optional step 308, the comparison module 218 identifies accounts associated with unmanaged systems. In some embodiments, the selection filter in later steps is applied to accounts associated with the unmanaged systems. Those skilled in the art will appreciate that the selection filter may be applied to identify accounts and/or systems.

In step 310, the selection module 216 receives a selection filter. In some embodiments, the selection module 216 retrieves one or more selection filters from storage (e.g., RAM or hard drive). The selection module 216 may also receive one or more selection filters from the interface module 220.

In step 312, the selection module 216 applies the received one or more selection filters to the scan result from the scan module 214. The selection filters may comprise one or more selection criteria which may be used to select none, one, some or all of the systems of the scan result.

In step 314, the selection module 216 may configure the password manager module 202 to manage the selected systems. In one example, the selection module 216 adds the system and/or account associated with the system to the account management module 206. The selection module 216 may also add the system and/or account to the managed services database 220 and/or the managed user accounts database 222. The password manager module 202 may then manage the selected system(s). In one example, the password manager module 202 may access a selected system, create a new password, and change the old password of the selected system for the new password as in step 316. The password manager module 202 may also change the password upon an expiration event and require users and/or user devices 102 to request a password to access the selected system. The password manager module 202 may authenticate or require approval of the password request before a password is checked out.

Figure 4:
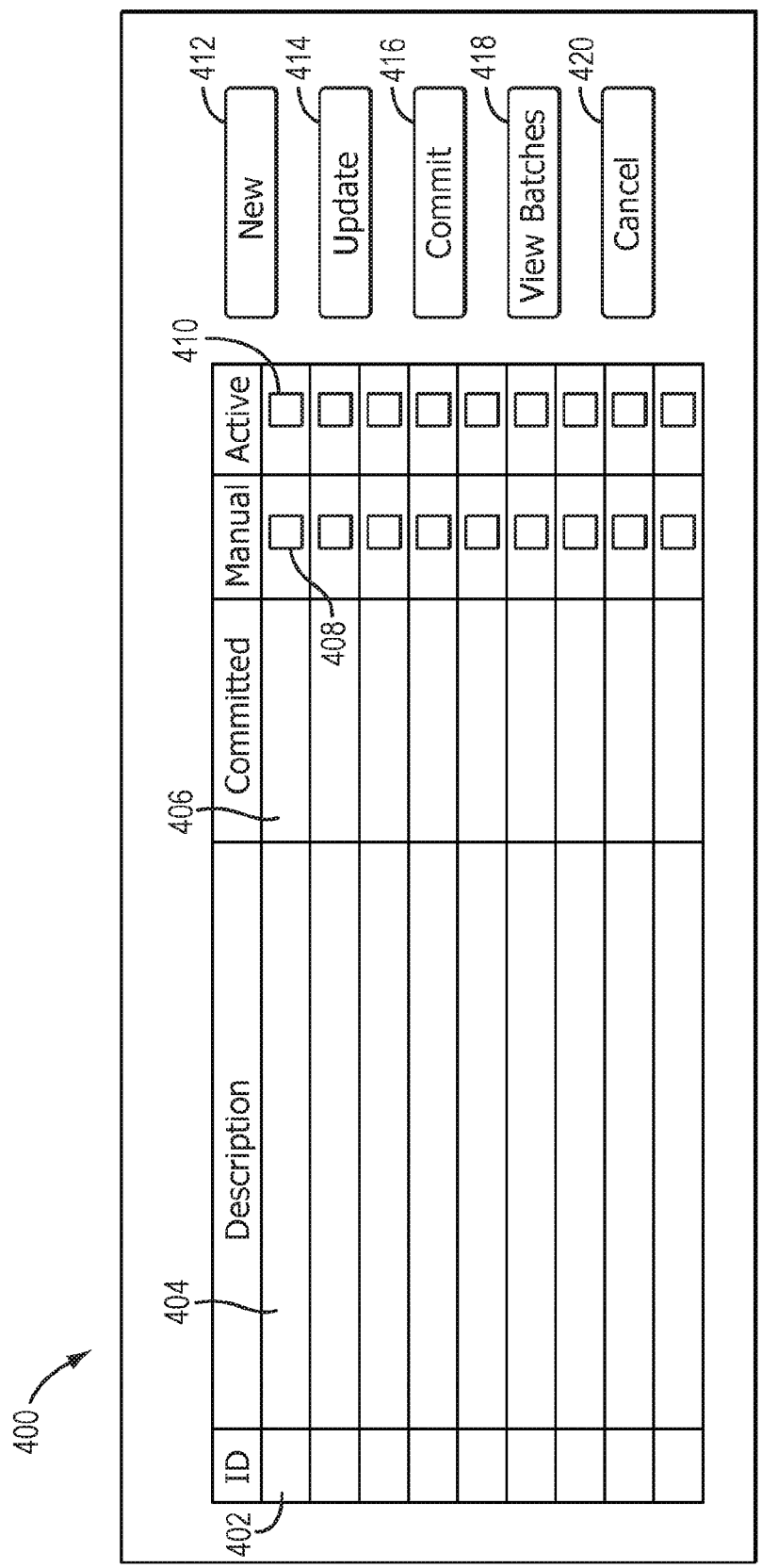
FIG. 4 depicts a filter selection page in one embodiment. The filter selection page may be used to create, update, or alter selection filters.

FIG. 4 depicts a filter selection page 400 in one embodiment. The filter selection page may be used to create, update, or alter selection filters. In some embodiments, the filter selection page 400 may display a summary of a plurality of selection filters. The filter selection page 400 comprises an identifier field 402, a description field 404, a committed identifier field 406, a manual checkbox 408, an active checkbox 410, a new button 412, an update button 414, a commit button 416, a view batches button 418, and a cancel button 420.

In various embodiments, the selection module 216 of the security appliance 108 generates and displays the filter selection page 400. The filter selection page 400 may identify, in summary form, multiple selection filters and their status. An administrator or other authorized user may view, edit, update, commit, and/or add new information to one or more selection filters via buttons on the filter selection page 400. In some embodiments, the administrator must obtain one or more rights before being able to view, edit, update, commit, and/or add new information one or more the selection filters. The administrator may be required to possess certain rights to view, edit, create, or delete one selection filter and fewer rights to view, edit, create and/or delete another selection filter.

The identifier ("ID") field 402 is a field that identifies a selection filter. In some embodiments, the ID in the identifier field 402 is generated automatically by the selection module 216 and/or the interface module 220.

The description field 404 allows for a description of the selection filter. The description may be entered by an administrator, for example. In various embodiments, the administrator or authorized user describes the selection filter such that the function of the selection filter may be easily recognized. In another example, all or part of the description may be automatically generated by the selection module 216 and/or the interface module 220.

The committed field 406 indicates if the selected filter is committed. Once the selected filter is committed, the selected filter may then be applied to one or more scan results. When the selected filter is not committed, the selected filter will not be applied. In one example, a selection filter may be created, changed, modified, approved, and/or tested before being committed and actively applied to a scan result. Once the selected filter is ready, the administrator may commit the selection filter such that the selection filter may be applied to the next scan result (e.g., either before or after the scan result is compared to a list of managed systems). In other words, until the selection filter is committed, the selection filter is separate from the process of updating managed systems and managed accounts by the security appliance 108.

In some embodiments, once the selection filter is committed, the filter may be frozen for historical purposes. In some embodiments, the description in the description field 404 and/or the selection filter may be updated, cancelled, or otherwise altered, however, the update, cancellation or alternation is logged and the effect is tracked. Once a selection filter is created, it may be reviewed by one or more other users for approval.

A selection filter may be marked as "manual" in the manual checkbox 408. When a selection filter is identified as manual, the selection filter may be applied once to one scan result. In other words, after application to one or more limited number of scan result, a selection filter marked as "manual" may not be applied to future scan result.

A selected filter may also be marked as "active" in the active checkbox 410. When a selection filter is marked as active, the selection filter may be applied to every new scan result. As a result, in one example, new systems selected by the "active" selection filter may be brought under password management as soon as they are discovered.

To create a new selection filter, the administrator may activate the new button 412. Once the new button 412 is activated, the selection module 216 may generate a filter details window (see FIG. 5) from which the administrator may create the new selection filter.

In order to update a selection filter that is already created, the administrator may highlight the desired selection filter (e.g., by highlighting the associated ID of the ID field 402 or description of the associated description field 404) and activating the update button 414. Once the update button 414 is activated, the selection module 216 may generate a filter details window (see FIG. 5) which identifies the selection filter to be updated. The filter details window may allow the administrator to make changes to an existing selection filter.

Once an administrator has created and/or updated one or more selection filters, the administrator may activate the commit button 416. Once the commit button 416 is activated, the new and updated selection filters may be applied to scan result of a future scan. Once the selection filter is committed, the committed field 406 may identify the selection filter as committed and may show the date and/or time that the filter was committed.

The view batches button 418 may allow an administrator to view a scan result or and/or selected systems from the scan result. If the administrator activates the cancel button 420, the administrator may cancel (e.g., close) the filter selection page 400.

Figure 5:
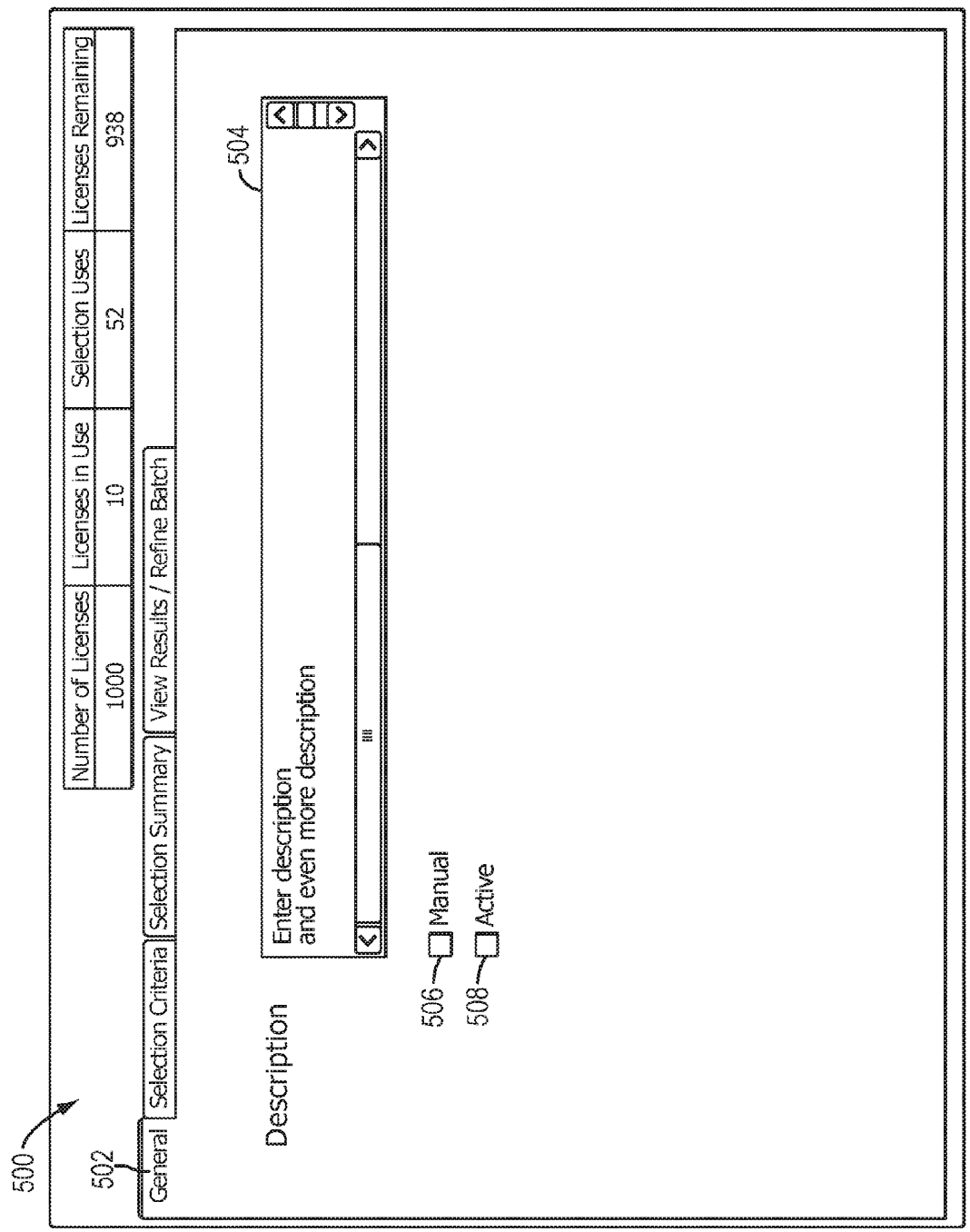
FIG. 5 is an interface display of a general tab window within the selection filer details window in an embodiment.

FIG. 5 is an interface display of a general tab 502 window within the selection filer details window 500 in an embodiment. The selection filter details window 500 may comprise the general tab 502, a selection criteria tab (see FIG. 6), a selection summary tab (see FIG. 7), and a view results/refine batch tab (see FIG. 8). The general tab 502 window comprises a description field 504 as well as a manual checkbox 506 and an active checkbox 508. In various embodiments, an administrator may enter a description within the description field 504. The description describes and/or identifies the selection filter and/or the function of the selection filter. The all or part of the description in the description field 504 may appear in the description field 404 of FIG. 4.

The administrator may check the manual checkbox 506 to make the selection filter "manual" (see discussion regarding selection filters marked as "manual" herein) or may check the active checkbox 508 to create an "active" selection filter (also see discussion of selection filters marked as "active" herein).

FIG. 6 is an interface display of the selection criteria tab 602 window within the selection filer details window 500 in an embodiment. In various embodiments, the selection criteria tab 602 window may be used by an administrator to specify one or more criterion of a selection filter. The criteria are rules in which the selection filter follows to make selections from the result of a scan. The selection criteria tab 602 window may comprise a plurality of relationship (i.e., conjunction) fields 604, a plurality of category fields 606, a plurality of quality fields 608, and a plurality of value fields 610.

The relationship fields 604 may comprise pull down menus specifying "and" and "or" functions. In some embodiments, each row represents a selection criterion which may be grouped with other criteria. For example, when a grouping field 604 indicates an "and" term, two separate criteria must be determined to be true before the selection filter makes a selection from the results of a scan. In another example, if the grouping field 604 indicates an "or" term, either of two criteria must be determined to be true before the selection filter makes a selection from the results of the scan. Those skilled in the art will appreciate that many criteria may be used and grouped in many different ways.

In other embodiments, the relationship fields 604 may also specify a priority. The relationship fields 604 may specify that two selection criteria be grouped together (e.g., A and B) before further operations are performed (e.g., (A and B) or C).

The category fields 606 may allow an administrator to specify one or more different categories, including, but not limited to service name, service account name, system name, platforms, domains, sites, organizational units, groups, and "on hold." In one example, the category fields 606 may allow the administrator to identify a specific category and a value field 610 associated with the category. There may be any number of categories. In some embodiments, the administrator may create their own categories which may be used to make criteria for one or more selection filters.

The quality field 608 may include, but is not limited to, options for equal or not equal. The quality field 608 may be associated with creating comparisons between categories and values. In one example, if the category is equal to the value, then the selection filter may make selections when the category and the value are equal. In another example, if the category is not equal to the value, then the selection filter may make selections when the category and the value are not equal.

The value field 610 may comprise one or more values that are equal or not equal to the category depending upon the associated quality field 608. In one example, the administrator may select the category "organizational units" and enter in the value "accounting." As such, if the quality field 408 is "equal," the selection filter may apply to systems associated with the accounting OU. More then one term may be entered in the value field 610. Further, multiple terms may be put together with logic defining the relationship of the terms (e g, similar to a Boolean search query). Those skilled in the art will appreciate that there are many ways in which criteria may be formed based on equivalence (or lack of equivalence) between categories and values.

FIG. 7 is an interface display of a selection summary tab 702 window within the selection filer details window 500 in an embodiment. The selection summary tab 702 window may comprise a category listing field 704, an enterprise result field 706, a managed result field 708, an on-hold result field 710, a disabled result field 712, an unresponsive result field 714, a selected result field 716, and an unselected result field 718. The category listing fields 704 may comprise all platforms, domains, sites, organizational units, and groups that the scanning module has identified (e.g., one or more scan result related one or more scans of one or more directory structures). The category listing fields 704 may also comprising any other physical and/or logical groupings of systems found by the scan module.

The enterprise result field 706, managed result field 708, on-hold result field 710, disabled result field 712, unresponsive result field 714, selected result field 716, and unselected result field 718 may each comprise a number of associated systems or identify associated systems. For example, the enterprise result 706 may identify the total number systems (e.g., hardware or logical units) that are associated with one or more enterprises.

In some embodiments, the scan module 214 scans one or more directory structures for systems. The scan module 214 may provide the categories associated with the systems and/or accounts in the scan result to the category listing field and provide the total number of systems associated with one or more enterprise to the enterprise result field 704. In one example, the enterprise field 706 associated with windows server 2000 may indicate 13 systems while the enterprise field 706 associated with the windows server 2003 may indicate 20 systems. This may indicate that there are 20 servers running Windows Server version 2003 systems associated with the enterprise and that the enterprise is also associated with 13 servers running Windows Server version 2000. The other numbers in other fields as depicted in FIG. 7 may be displayed according to the same or similar methodology (e.g., on-hold field 710 may indicate that the there are 3 Solaris systems on-hold in one field and 1 Linux system on-hold in another field).

The managed result field 708 may identify a number, name, or be associated with the hardware and/or logical units of the categories to identify the systems that are managed. In some embodiments, the scan module 214 scans one or more directory structures for systems. The comparison module 218 may then compare the scan result to a list of managed systems. Those systems that are found to be on the list of managed systems may be defined as managed systems. The comparison module 218 may then supply the number of managed systems to the managed field 708.

The on-hold result field 710 may identify a system that is currently not managed as a result of being put on-hold by an authorized user such as an administrator. The number of systems that are disabled or unresponsive may be also identified in the disabled result field 712 and the unresponsive result field 714, respectively. In some embodiments, the account management module 206, scan module 214, or the selection module 216 may track which systems have been designated by one or more users as on-hold, disabled, or unresponsive. In various embodiments, the security appliance 108 may attempt to contact one or more systems found during a scan to confirm that the system is responsive. If the system is not responsive, the scan module 214 may log the event and keep track of which system is not responsive and provide a total in the unresponsive fields 714.

The systems that are selected or unselected are also identified by the selected result field 716 and the unselected result field 718, respectively. In some embodiments, the selection module 216 may determine the number of system that are selected due to one or more selection filters (e.g., the selection filter associated with the criteria identified in the selection criteria tab 602—see FIG. 6) that are not otherwise managed, on-hold, disabled, or unresponsive. The selection module 216 may then provide the totals to the selected result fields 716. The unselected result fields 718 may indicate all systems found by the scan that are not otherwise managed, on-hold, disabled, unresponsive, or selected by the selection filter.

FIG. 8 is an interface display of a view results/refine batch tab 802 window within the selection filer details window 500 in an embodiment. The view results/refine batch tab 802 window may comprise a list of systems that have been selected by the selection filter (e.g., the selection filter associated with the selection criteria identified in selection criteria tab 602 window. The view results/refine batch tab 802 window may comprise a plurality of select (displayed as "Sel") checkboxes 804, a plurality of system name fields 806, a plurality of platform fields 808, a plurality of domain fields 810, a plurality of OU (i.e., organization al unit) fields 812, a plurality of Site fields 814, a plurality of description fields 816, a plurality of group fields 818, a plurality of on-hold checkboxes 820, a plurality of disabled (displayed as "Dis") checkboxes 822, and a plurality of unresponsive (displayed as "unresp") checkboxes 824.

The plurality of select checkboxes 804 may indicate which systems are selected by the selection filter. A user such as an administrator may unselect one or more systems by unchecking the box of an associated system. By unchecking the box, the user may designate the system as to not be selected (e.g., remain unmanaged) in some embodiments.

One system name field 806, platform field 808, domain field 810, OU field 812, site fields 814, description field 816, and group field may be associated with a single system. The system name, platform name, domain name, OU name, site name, description, and group name may be retrieved by the selection module 216 from the scan result. In some embodiments, the scan module 214 retrieves the information from the directory structure and/or from each system.

The administrator may also check the on-hold checkbox to put the associated system (e.g., the system in the same row as the on-hold checkbox) on hold. In some embodiments, when the administrator designates a system as on-hold, the system remains on-hold and unmanaged until the designation is removed. Once a system is designated as being on-hold, one of the on-hold result field 710 in FIG. 7 may reflect the change.

The administrator may also check the checkbox for disabled (i.e., disabled checkbox 822) or unresponsive (i.e., unresponsive checkbox 824). Similar to being on-hold, in some embodiments, when the administrator designates a system as disabled, the system remains disabled and unmanaged until the designation is removed. Once a system is designated as being disabled, one of the disabled result field 712 in FIG. 7 may reflect the change.

Similarly, in some embodiments, when a system is unresponsive (or unreachable), the system may be identified as unresponsive and unmanaged until sufficient communication is established. Once a system is designated as being unresponsive, one of the unresponsive result field 714 in FIG. 7 may reflect the change.

In various embodiments, when a system is either disabled or unresponsive, the selection module 216 may automatically check the disabled checkbox 822 and/or the unresponsive checkbox 824, respectively.

Figure 9:
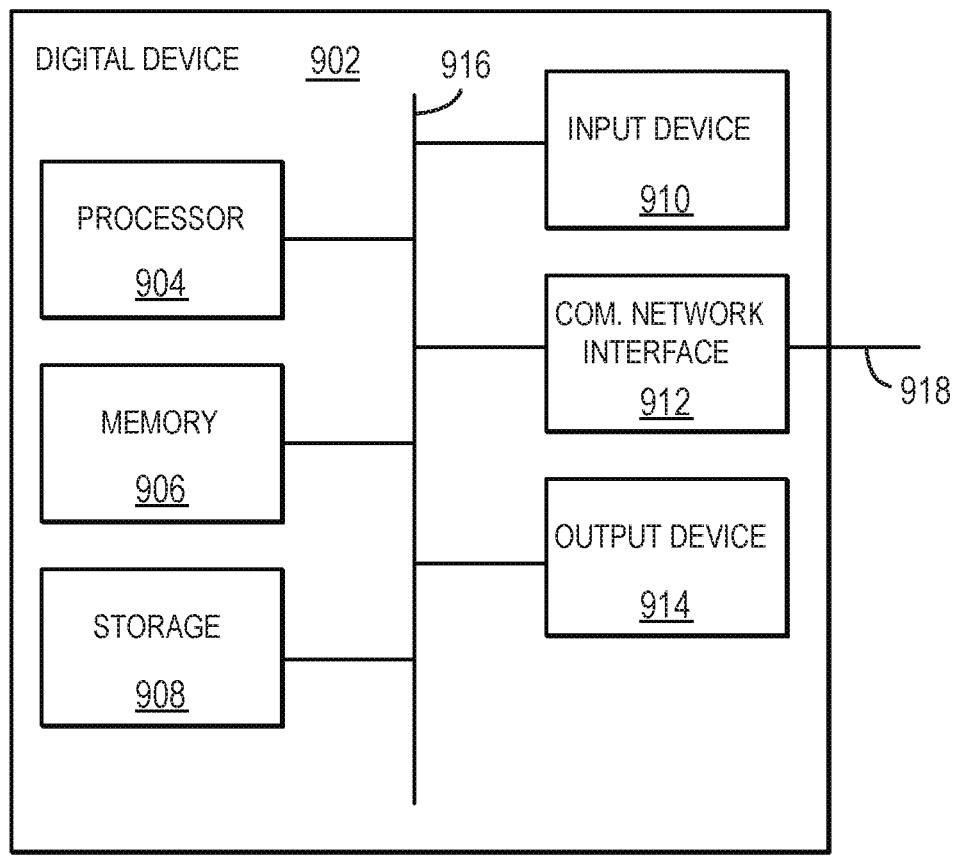
FIG. 9 is a block diagram of an exemplary digital device.

FIG. 9 is a block diagram of an exemplary digital device 902. Any of the client device 102, the manager device 104, the administrator device 106, the security appliance 108, routers/switches 110, firewalls 112, the windows servers 114, the UNIX servers 116, the Linux servers 118, the AS/400 servers 120, the z/OS mainframes 122, and databases 124 may be an instance of the digital device 902. The digital device 902 comprises a processor 904, memory system 906, storage system 908, an input device 910, a communication network interface 912, and an output device 914 communicatively coupled to a communication channel 916. The processor 904 is configured to execute executable instructions (e.g., programs). In some embodiments, the processor 904 comprises circuitry or any processor capable of processing the executable instructions.

The memory system 906 stores data. Some examples of memory system 906 include storage devices, such as RAM, ROM, RAM cache, virtual memory, etc. In various embodiments, working data is stored within the memory system 906. The data within the memory system 906 may be cleared or ultimately transferred to the storage system 908.

The storage system 908 includes any storage configured to retrieve and store data. Some examples of the storage system 908 include flash drives, hard drives, optical drives, and/or magnetic tape. Each of the memory system 906 and the storage system 908 comprises a computer-readable medium, which stores instructions or programs executable by processor 904.

The input device 910 is any device such an interface that receives inputs data (e.g., via mouse and keyboard). The output device 914 is an interface that outputs data (e.g., to a speaker or display). Those skilled in the art will appreciate that the storage system 908, input device 910, and output device 914 may be optional. For example, the routers/switchers 110 may comprise the processor 904 and memory system 906 as well as a device to receive and output data (e.g., the communication network interface 912 and/or the output device 914).

The communication network interface (com. network interface) 912 may be coupled to a network (e.g., computer network 126) via the link 918. The communication network interface 912 may support communication over an Ethernet connection, a serial connection, a parallel connection, and/or an ATA connection. The communication network interface 912 may also support wireless communication (e.g., 802.11 a/b/g/n, WiMax, LTE, WiFi). It will be apparent to those skilled in the art that the communication network interface 912 can support many wired and wireless standards.

It will be appreciated by those skilled in the art that the hardware elements of the digital device 902 are not limited to those depicted in FIG. 9. A digital device 902 may comprise more or less hardware, software and/or firmware components than those depicted (e.g., drivers, operating systems, touch screens, biometric analyzers, etc.). Further, hardware elements may share functionality and still be within various embodiments described herein. In one example, encoding and/or decoding may be performed by the processor 904 and/or a co-processor located on a GPU (i.e., Nvidia).

The above-described functions and components can comprise instructions that are stored on a storage medium such as a computer readable medium. Some examples of instructions include software, program code, and firmware. The instructions can be retrieved and executed by a processor in many ways.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A method, comprising:
receiving a trusted program factor at a security appliance, the trusted program factor associated with a seeking application to access a secured application or secured database;
receiving, by the security appliance, an access request for the seeking application to access the secured application or secured database, the access request being received from a client device separate from the security appliance;
obtaining, by the security appliance, a program factor instance for the seeking application in response to the receiving the access request;
comparing, by the security appliance, the program factor instance and the trusted program factor;
confirming, by the security appliance, authorization of the seeking application to access the secured application or secured database based on the comparison; and
elevating a user right associated with a user account having access to the secured application or secured database when the authorization of the seeking application to access the secured application or database is confirmed, the access by the user account being based at least in part on the user right.

2. The method of claim 1, wherein the trusted program factor is selected from a group consisting of a program name, a program version, a program executable hash, a dependent DLL name, shared library names, a dependent DLL version, shared library versions, environmental factors, and debugging identification.

3. The method of claim 1, wherein the trusted program factor is selected from a group consisting of a system name, a fully qualified domain name (FQDN), a domain name, an IP address, a MAC address, a user name, a user ID, a CPU ID, a CPU serial number, a root disk volume ID, an OS version, and an OS type.

4. The method of claim 1, wherein the user right determines whether a user can view, access, make a change to, or share the secured application or secured database.

5. A system, comprising:
memory;
a hardware processor; and
a security system module configured by the hardware processor to:
receive a trusted program factor at a security appliance, the trusted program factor associated with a seeking application to access a secured application or secured database;
receive an access request for the seeking application to access the secured application or secured database, the access request being received from a client device separate from the security appliance;
obtain a program factor instance for the seeking application in response to the receiving the access request;
compare the program factor instance and the trusted program factor;
confirm authorization of the seeking application to access the secured application or secured database based on the comparison; and
elevate a user right associated with a user account having access to the secured application or secured database when the authorization of the seeking application to access the secured application or database is confirmed, the access by the user account being based at least in part on the user right.

6. The system of claim 5, wherein the trusted program factor is selected from a group consisting of a program name, a program version, a program executable hash, a dependent DLL name, shared library names, a dependent DLL version, shared library versions, environmental factors, and debugging identification.

7. The system of claim 5, wherein the trusted program factor is selected from a group consisting of a system name, a fully qualified domain name (FQDN), a domain name, an IP address, a MAC address, a user name, a user ID, a CPU ID, a CPU serial number, a root disk volume ID, an OS version, and an OS type.

8. The system of claim 5, wherein the user right determines whether a user can view, access, make a change to, or share the secured application or secured database.

9. A non-transitory computer readable medium comprising executable instructions, the instructions being executable by a processor to perform a method, the method comprising:
receiving a trusted program factor at a security appliance, the trusted program factor associated with a seeking application to access a secured application or secured database;
receiving, by the security appliance, an access request for the seeking application to access the secured application or secured database, the access request being received from a client device separate from the security appliance;
obtaining, by the security appliance, a program factor instance for the seeking application in response to the receiving the access request;
comparing, by the security appliance, the program factor instance and the trusted program factor;
confirming, by the security appliance, authorization of the seeking application to access the secured application or secured database based on the comparison; and
elevating a user right associated with a user account having access to the secured application or secured database when the authorization of the seeking application to access the secured application or database is confirmed, the access by the user account being based at least in part on the user right.

10. The non-transitory computer readable medium of claim 9, wherein the trusted program factor is selected from a group consisting of a program name, a program version, a program executable hash, a dependent DLL name, shared library names, a dependent DLL version, shared library versions, environmental factors, and debugging identification.

11. The non-transitory computer readable medium of claim 9, wherein the trusted program factor is selected from a group consisting of a system name, a fully qualified domain name (FQDN), a domain name, an IP address, a MAC address, a user name, a user ID, a CPU ID, a CPU serial number, a root disk volume ID, an OS version, and an OS type.

12. The non-transitory computer readable medium of claim 9, wherein the user right determines whether a user can view, access, make a change to, or share the secured application or secured database.

\* \* \* \* \*